United States Patent [19]

Porter et al.

[11] Patent Number: 5,838,318
[45] Date of Patent: *Nov. 17, 1998

[54] METHOD AND APPARATUS FOR AUTOMATICALLY AND INTELLIGENTLY ARRANGING WINDOWS ON A DISPLAY DEVICE

[75] Inventors: Daniel R. Porter; Anthony C. Salvador, both of Portland; Rune A. Skarbo, Hillsboro, all of Oreg.

[73] Assignee: Intel Corporation, Santa Clara, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 556,026

[22] Filed: Nov. 10, 1995

[51] Int. Cl.$^6$ .................................................. G06F 3/00
[52] U.S. Cl. ............................................. 345/342
[58] Field of Search .................... 395/340, 342, 395/343, 344, 345, 333, 334; 345/340, 342

[56] References Cited

U.S. PATENT DOCUMENTS

| | | | |
|---|---|---|---|
| 4,819,189 | 4/1989 | Kikuchi et al. | 345/345 |
| 4,890,257 | 12/1989 | Anthias et al. | 345/344 |
| 5,060,170 | 10/1991 | Bourgeois et al. | 345/342 |
| 5,091,720 | 2/1992 | Wood | 345/507 |
| 5,129,055 | 7/1992 | Yamazaki et al. | 345/344 |
| 5,237,653 | 8/1993 | Noguchi et al. | 345/345 |
| 5,371,847 | 12/1994 | Hargrove | 345/342 |
| 5,561,757 | 10/1996 | Southgate | 345/340 |
| 5,600,346 | 2/1997 | Kamata et al. | 345/340 |
| 5,712,995 | 1/1998 | Cohn | 345/342 |

OTHER PUBLICATIONS

"PictureTel introduces new Windows 95–based desktop videoconferencing product: New standards–based PCS 200 jointly developed with Compaq", PictureTel Corporation News Release, 16 Oct., 1995, pp. 1–4.

Primary Examiner—A. Katbab
Attorney, Agent, or Firm—Blakely, Sokoloff, Taylor & Zafman

[57] ABSTRACT

A method and apparatus for automatically arranging windows on a display device where each of a first set of the plurality of windows includes a class designation, and the class designation for each window of this first set of windows can be different. The method identifies the class designation for each window of this first set of windows and arranges the first set of windows on the display according to the class designation of each window of the first set.

24 Claims, 9 Drawing Sheets

METHOD AND APPARATUS FOR AUTOMATICALLY AND INTELLIGENTLY ARRANGING WINDOWS ON A DISPLAY DEVICE

BACKGROUND OF THE INVENTION

1. Field of the Invention

The present invention pertains to the field of windowed display devices. More particularly, this invention relates to the automatic arrangement of windows on a display device.

2. Background

Computer technology is continuously advancing, resulting in modern computer systems which provide ever-increasing performance. One result of this improved performance is an increased use of computer systems by individuals in a wide variety of business, academic and personal pursuits. The increased performance of computer systems, as well as a reduced cost of certain hardware components (such as memory chips), has allowed individual computer systems to execute multiple applications concurrently. One or more of these multiple applications can be displayed to a user concurrently using separate windows or a display device. Each of these multiple applications can also have multiple document windows displayed on the display device of the computer system.

The benefits of concurrent display of multiple windows on a display device are numerous. Among these benefits is the ability of the computer system user to look at data from different applications (or different documents of one or more applications) at the same time. For example, an individual could have windows displayed which correspond to a word processing document, a spreadsheet document, and a video conference in progress.

One problem with such multi-window displays, however, is the arrangement of the windows on the display. Different windows often have different importance to users. For example, during a data and video conference a user may prefer viewing the other conference participant(s) in a window which is larger than a window displaying less-important personal notes being entered by the user.

One additional problem experienced by many users is difficulty in managing the display of multiple windows on their display device. This problem is further intensified when a user desires to pay attention to a particular one or more windows in real-time, such as a data and/or video conferencing window. Thus, it would be beneficial to provide a mechanism which alleviates users of the burden of managing the windows on their display device.

One prior art method for re-arranging windows on a display was to let the individual users arrange the windows manually. That is, the users could re-size windows and "click and drag" windows to new locations themselves. This manual re-arranging of windows, however, is an inconvenient and often time-consuming process. This is particularly true when the end user is paying attention to a particular window in real-time. Thus, it would be beneficial to provide a mechanism which automatically arranges windows on a display device.

In another prior art method for re-arranging windows on a display, the user was able to use a grid to identify which areas on the display device could include windows. This identification, however, did not provide any intelligence to the window arrangement process—windows displaying very important information and windows displaying information of little importance were both treated equally. Therefore, valuable display area could be occupied by information of little importance when very important information would be better displayed in that area. Thus, it would be beneficial to provide a mechanism which intelligently arranges windows, based on the importance and functionality of the windows.

Additionally, different users may have different preferences or priorities in the arrangement of windows on their display. For example, what is most important to one user may be less important to another. Additionally, individual preferences may affect the window arrangement preferences of users. For example, some may prefer a cascade approach to windows arrangements, whereas others may prefer a tiled approach. Thus, it would be beneficial to provide a mechanism which allows windows to be automatically arranged according to individual user preferences.

In addition, some users either may not know whether their current window arrangement can be improved or may not care to spend the time thinking about whether the arrangement can be improved. For example, some applications, due to the data typically associated with the applications, are better arranged so that the horizontal display area is increased. Thus, it would be beneficial to provide a mechanism which allows windows to be arranged in an intelligent manner, based on the importance and types of windows being displayed.

Furthermore, a wide variety of computer systems having a wide variety of different display resolutions are readily available which support windowed displays. Thus, the window arrangement preferences of different users may be different, based on the display device resolutions. Thus, it would be beneficial to provide a mechanism for automatically arranging windows which is independent of the display resolution.

In addition, the environment of the computer system may be continually changing. That is, application windows can be opened and closed, application document windows can be opened and closed, etc. Each of these events can alter the arrangement of windows on the display device. For example, an important application window may be opened with no area available on the display to place the new window without overlaying a previously opened important window. Thus, it would be beneficial to provide a mechanism for automatically and intelligently re-arranging the windows on a display device upon the happening of certain events in the system.

As will be described in more detail below, the present invention provides for a method and apparatus that achieves these and other desired results which will be apparent to those skilled in the art from the description to follow.

SUMMARY OF THE INVENTION

A method and apparatus for automatically and intelligently arranging windows on a display device is described herein. Each of a first set of the plurality of windows includes a class designation, and the class designation for each window of this first set of windows can be different. The method identifies the class designation for each window of this first set of windows and arranges the first set of windows on the display according to the class designation of each window of the first set.

According to one embodiment of the present invention, the method requests the class designation from each window of the plurality of windows and records the class designation identified by each of the first set of windows. The method then divides the display into a plurality of display areas and allocates the plurality of display areas to sets of the plurality of windows, wherein each window of a set of windows has the same class designation. Thus, the present invention is able to intelligently arrange windows on the display based on functionality and importance (as determined by the class designations).

According to another embodiment of the present invention, the windows on the display are automatically arranged in response to certain predetermined events, such as opening a new window or closing a window.

BRIEF DESCRIPTION OF THE DRAWINGS

The present invention is illustrated by way of example and not limitation in the figures of the accompanying drawings, in which like references indicate similar elements and in which.

DETAILED DESCRIPTION

In the following detailed description numerous specific details are set forth in order to provide a thorough understanding of the present invention. However, it will be understood by those skilled in the art that the present invention may be practiced without these specific details. In other instances, well known methods, procedures, components, and circuits have not been described in detail so as not to obscure aspects of the present invention.

The present invention provides a method for automatically and intelligently arranging windows on a display. The window arrangement of the present invention is based on functionality and window purpose, rather than being random or treating every window as being of equal importance. The present invention arranges windows on the display so that windows of greater functionality are more prominently displayed than those of lesser functionality, thereby assisting the user in viewing the information displayed in the various windows. Additionally, the present invention allows windows to be categorized into different classes and allows the windows of one class to be arranged differently from the windows of another class. Furthermore, in one embodiment, the present invention automatically arranges the windows on a display device upon the occurrence of certain events, such as opening a new window.

Figure 1:
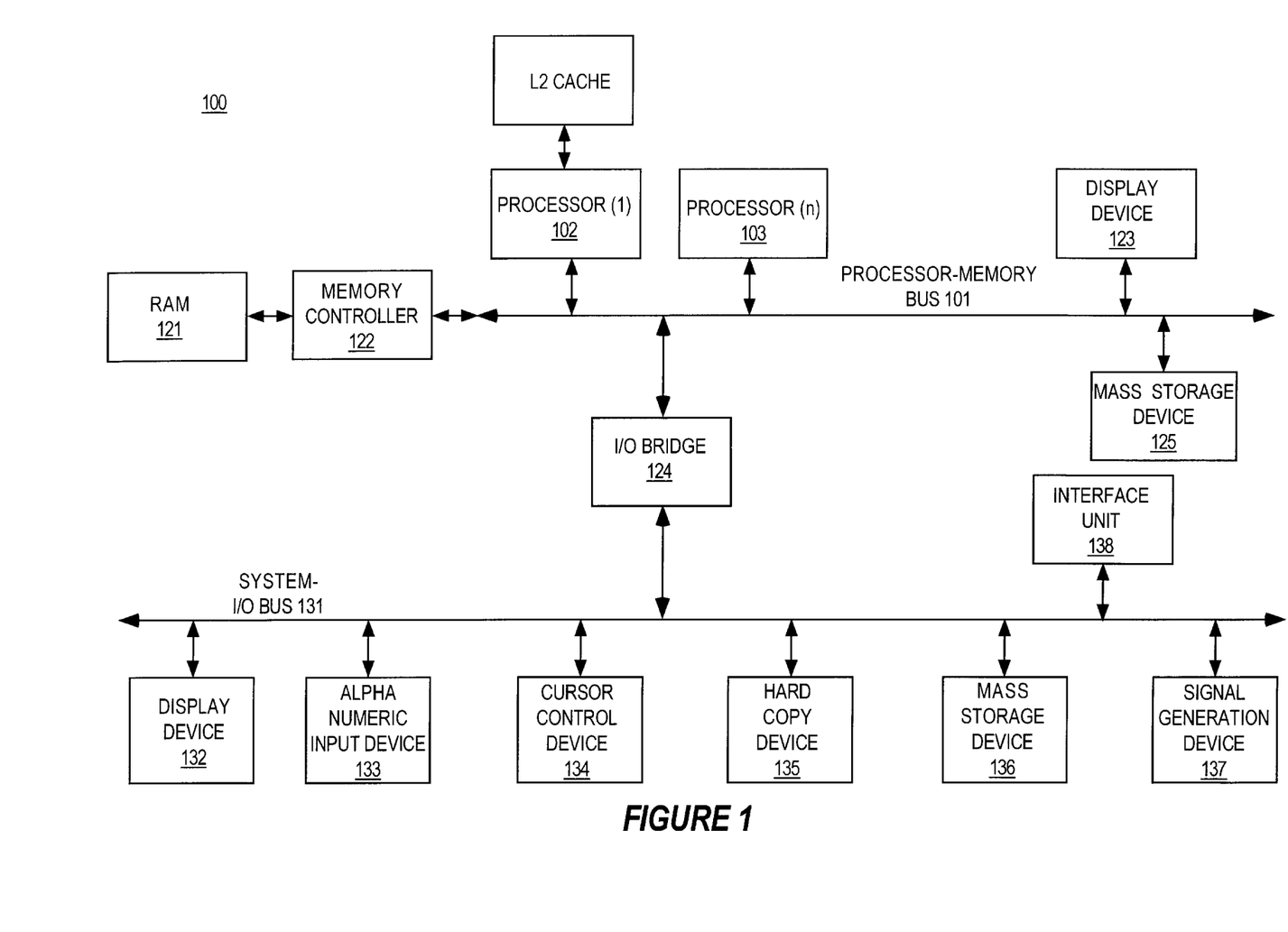
FIG. 1 shows an overview of a computer system such as may be used with one embodiment of the present invention.

FIG. 1 shows an overview of a computer system such as may be used with one embodiment of the present invention. The computer system 100 generally comprises a processor-memory bus or other communication means 101 for communicating information between one or more processors 102 and 103. Processor-memory bus 101 includes address, data and control buses and is coupled to multiple devices or agents. Processors 102 and 103 may include a small, extremely fast internal cache memory (not shown), commonly referred to as a level one (L1) cache memory for temporarily storing data and instructions on-chip. In addition, a bigger, slower level two (L2) cache memory 104 can be coupled to processor 102 or processor 103 for temporarily storing data and instructions for use by the processor. In one embodiment, processors 102 and 103 are Intel® Architecture compatible microprocessors, such as i386™, i486™, or Pentium™ processors. However, the present invention may utilize any type of microprocessor, including different types of processors.

Also coupled to processor-memory bus 101 is processor 103 for processing information in conjunction with processor 102. Processor 103 may comprise a parallel processor, such as a processor similar to or the same as processor 102. Alternatively, processor 103 may comprise a co-processor, such as a digital signal processor. The processor-memory bus 101 provides system access to the memory and input/output (I/O) subsystems. A memory controller 122 is coupled with processor-memory bus 101 for controlling access to a random access memory (RAM) or other dynamic storage device 121 (commonly referred to as a main memory) for storing information and instructions for processor 102 and processor 103. A mass data storage device 125, such as a magnetic disk and disk drive, for storing information and instructions, and a display device 123, such as a cathode ray tube (CRT), liquid crystal display (LCD), etc., for displaying information to the computer user are coupled to processor-memory bus 101.

An input/output (I/O) bridge 124 is coupled to processor-memory bus 101 and system I/O bus 131 to provide a communication path or gateway for devices on either processor-memory bus 101 or I/O bus 131 to access or transfer data between devices on the other bus. Essentially, bridge 124 is an interface between the system I/O bus 131 and the processor-memory bus 101.

System I/O bus 131 communicates information between peripheral devices in the computer system. In one embodiment, system I/O bus 131 is a Peripheral Component Interconnect (PCI) bus. Devices that may be coupled to system I/O bus 131 include a display device 132, such as a cathode ray tube, liquid crystal display, etc., an alphanumeric input device 133 including alphanumeric and other keys, etc., for communicating information and command selections to other devices in the computer system (for example, processor 102) and a cursor control device 134 for controlling cursor or pointer movement. Moreover, a hard copy device 135, such as a plotter or printer, for providing a visual representation of the computer images and a mass storage device 136, such as a magnetic disk and disk drive, for storing information and instructions, and a signal generation device 137 may also be coupled to system I/O bus 131.

In one embodiment of the present invention, signal generation device 137 includes, as an input device, a standard microphone to input audio or voice data to be processed by the computer system. The signal generation device 137 also includes an analog to digital converter to transform analog audio data to digital form which can be processed by the computer system. The signal generation device 137 also includes, as an output, a standard speaker for realizing the output audio from input signals from the computer system. Signal generation device 137 also includes well known audio processing hardware to transform digital audio data to audio signals for output to the speaker, thus creating an audible output.

In one embodiment of the present invention, signal generation device 137 also includes, as an input device, a ProShare™ video camera to input video images to be processed by the computer system. The video camera is coupled to an analog to digital converter to transfer analog video data to digital form which can be processed by the computer system.

An interface unit 138 is also coupled with system I/O bus 131. Interface unit 138 allows system 100 to communicate with other computer systems by sending and receiving the video, audio and data signals for the conference, as well as the necessary control signals based on the communication medium being used. In one embodiment, interface 138 is a conventional ISDN adapter which provides communication between the system 100 and an ISDN line. Alternatively, interface unit 138 could be a modem, a conventional network adapter such as an Ethernet LAN adapter, or any of a wide variety of other communication devices.

The display device 132 used with the present invention may be a liquid crystal device, cathode ray tube, or other display device suitable for creating graphic images and alphanumeric characters (and ideographic character sets) recognizable to the user. It should be noted that the display device 132, as well as display device 123, of the end point can have any of a wide range of display resolutions, typically referenced in terms of pixels. A pixel is an individual display location which can be illuminated or otherwise activated on the display device, and can be represented by a unique (x,y) coordinate. Typical display resolutions are 640×480 pixels, 800×600 pixels, 1024×768 pixels, and 1280×1024 pixels. It is to be appreciated, however, that the present invention is equally applicable to any display resolution.

The cursor control device 134 allows the computer user to dynamically signal the two dimensional movement of a visible symbol (pointer) on a display screen of the display device 132. Many implementations of the cursor control device are known in the art including a trackball, trackpad, mouse, joystick or special keys on the alphanumeric input device 133 capable of signaling movement of a given direction or manner of displacement. It is to be appreciated that the cursor also may be directed and or activated via input from the keyboard using special keys and key sequence commands. Alternatively, the cursor may be directed and/or activated via input from a number of specially adapted cursor directing devices, including those uniquely developed for the disabled.

In one embodiment of the present invention, system 100 executes the Microsoft Windows™ operating system. Windows™ allows multiple applications to execute concurrently, each in a separate display window. Windows™ also allows different documents or viewed information (e.g., textual or image data) to be displayed in different display windows. It is to be appreciated that different display windows can have different sizes, and can also be re-sized manually by the individual users or by the present invention as discussed below. It is also to be appreciated that the present invention can use any of a wide variety of operating systems which support windowed displays.

Certain implementations of the present invention may include additional processors or other components. Additionally, certain implementations of the present invention may not require nor include all of the above components. For example, display device 123 or mass storage device 125 may not be coupled to processor-memory bus 101, or system 100 may contain only a single processor (e.g., only processor 102). Furthermore, the peripheral devices shown coupled to system I/O bus 131 may be coupled to processor-memory bus 101; in addition, in some implementations only a single bus may exist with the processors 102 and 103, memory controller 122, and peripheral devices 132 through 139 coupled to the single bus.

Figure 2:
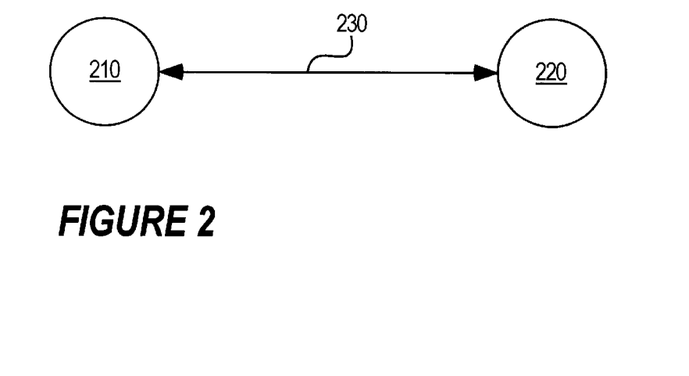
FIG. 2 shows a conferencing environment such as may be used with one embodiment of the present invention.

FIG. 2 shows a conferencing environment such as may be used with one embodiment of the present invention. Conferencing environment 200 includes two end points 210 and 220 coupled together by a communication link 230. In one implementation, each of the end points 210 and 220 are general purpose computer systems, such as system 100 of FIG. 1. Alternatively, end points 210 and 220 could be dedicated conferencing systems.

Communication link 230 represents any of a wide variety of conventional communication media. For example, communication link 230 can be an Integrated Services Digital Network (ISDN) or Plain Old Telephone Service (POTS) line, Ethernet cable, a fiber optic line, portions of the Internet, etc. Additionally, communication link 230 can be a wireless communication medium, such as signals propagating in the infrared or radio frequencies. Furthermore, communication link 230 can be a combination of communication media and can include converting devices for changing the form of the signal based on the communication media being used.

Figure 3:
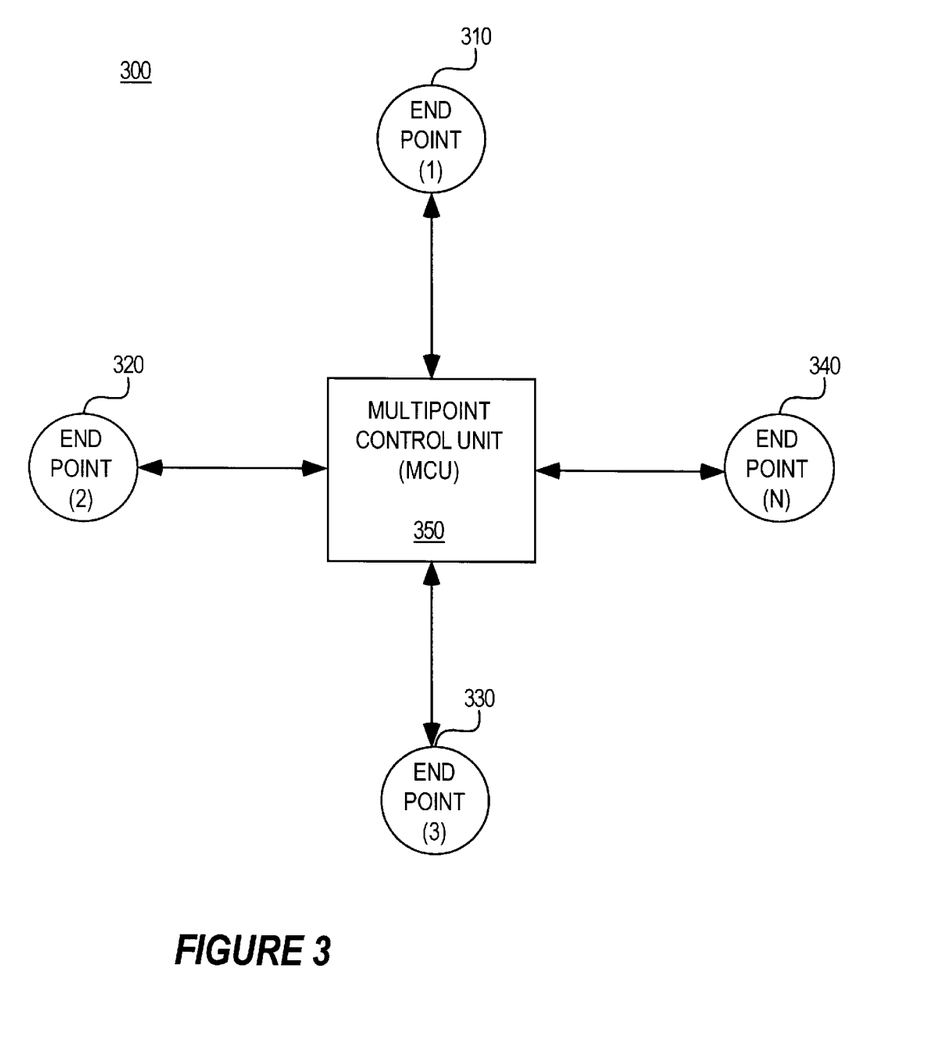
FIG. 3 shows an alternate conferencing environment such as may be used with one embodiment of the present invention.

FIG. 3 shows an alternate conferencing environment such as may be used with one embodiment of the present invention. Conferencing environment 300 includes multiple (N) end points: end point 310, end point 320, end point 330, and end point 340. In one implementation, each of the end points 310–340 is a general purpose computer system, such as system 100 of FIG. 1.

Each of the end points 310–340 are coupled together via a multipoint control unit (MCU) 350. MCU 350 is a switching device which transfers inputs received from each end point to the other end points. MCU 350 is coupled to each end point via a communication link, as shown in FIG. 3. Each communication link can be any of a wide variety of conventional communication media, analogous to communication link 230 of FIG. 2 discussed above.

Each end point 310–340 is coupled to a video camera, such as a ProShare™ video camera. The video cameras provide a visual representation of the user of the end point, thereby allowing each conference participant to see the other participants, even though they may be separated by great distances.

In one embodiment of the present invention, MCU 350 is a dedicated switching device. Alternatively, MCU 350 can be implemented in software, such as on a computer system coupled to a local area network (LAN). It is to be appreciated that any of a wide variety of conventional multipoint control units can be used with the present invention.

It should be noted that in some embodiments of the present invention MCU 350 is not necessary in multipoint conferences. In these embodiments, each end point receives all of the conferencing information and performs the switching function of MCU 350.

Applications can be shared between multiple systems in the conferencing environment by having the application execute on only a single system. This is typically referred to as "application sharing". The system which executes the application is referred to as the host system. The host system transfers the necessary information from the host system to one or more end points to allow the end point(s) to display the application and appear to the users of the end point(s) as if the application were actually executing at their end point(s).

Additionally, applications can also be shared between multiple systems in the conferencing environment where the application is executing at all of the end points. When an application is executing at multiple end points, each participant can make changes to the application data at his or her end point (subject to any turn-taking controls which may be in place). The end point then sends a message to all of the other end points indicating the changes which were made by the participant. The other end points receive these messages and provide the changes as inputs to the application they are executing. Examples of applications that can be executed at multiple end points include the ProShare™ notebook, file transfer applications, chat applications, photo exchange applications, address books, etc.

The conferencing environments which can be used with the present invention support both data conferences and audio/video conferences. A data conference is a conference where one or more documents or similar information are displayed to each participant (e.g., application sharing or the ProShare™ notebook). An audio/video conference is a conference where one or more visual images (e.g., images of conference participants) are displayed to each participant along with audio signals from the participants. The present invention also supports data and audio/video conferences concurrently, such as by displaying a conference participant, a document(s), and providing the participant's voice simultaneously. The conference data of a conference refers to the data or information being provided to the conference participants, such as a shared application information, video images or audio signals.

During an audio/video and/or data conference, multiple conference participants can provide inputs to the conference simultaneously. These inputs can be, for example, changes to a document, audio inputs (e.g., by speaking into a microphone), or visual inputs (e.g., moving within the field of view of the video camera). Whether these inputs are output to the other end points depends on what turn-taking controls, if any, are placed on the conference.

In one embodiment of the present invention, the display device of a computer system can display information using multiple display windows. Each window being displayed corresponds to a different application or a different document associated with that application. For example, a word processing application and a spreadsheet program may be executing on a computer system, both of which may have multiple data documents open in separate windows. The present invention categorizes display windows based on different window domains. Each window which can be displayed by the computer system can be part of any one of multiple domains. All of the windows within a particular domain are typically related in some manner. Examples of different domains include conferencing windows, drawing/figure windows, database windows, etc. The number of domains can vary from system to system, and, in one embodiment, individual users are able to define their own domains.

In one embodiment, the present invention categorizes display windows into two domains: conferencing windows and non-conferencing windows. In one implementation, the conferencing windows include one or more of the following: a conference manager window, a video window(s) showing another conference participant(s), and an application window(s). In one implementation, the conference manager window and the video window are the same window. The non-conferencing windows are the display windows which are not associated with an audio video and/or data conference.

The conference manager window corresponds to a conferencing application executing at an end point. The conferencing application provides a user interface and the connection support for conferencing. The video window provides a visual image of another one or more of the conferencing participants during a conference. The application window(s) contain the applications which are being shared as part of the conference.

The present invention separates windows of a domain into different classes with each class having a separate class designation (also referred to as a priority class or priority level). Each of the domains can have different numbers of class designations. In addition, different criteria can be used by the different domains in determining which windows are in which classes. All of the windows within a particular class of a domain are treated equally when being arranged.

In one embodiment of the present invention there are three class designations for a domain: Class 1 windows, Class 2 windows, and Class 3 windows. In one embodiment there is only one Class 1 window. In this embodiment, the Class 1 window is the video window.

Multiple Class 2 windows may exist. In one embodiment, the Class 2 windows correspond to applications which are being shared in the conferencing environment. The Class 2 windows typically correspond to applications for which it is preferable to see as much of the data as possible. This could include, for example, the ProShare™ notebook or applications displaying large amounts of data, such as word processing or spreadsheet applications. It is to be appreciated that any of a wide variety of applications can correspond to Class 2 windows, such as word processing applications, database programs, spreadsheet programs, games, etc.

The Class 3 windows correspond to applications for which it is typically preferable to see some activity, but it is not necessary to see a large display. Class 3 windows could correspond to, for example, a file transfer program, or a chat program which allows typed messages to be sent to and from other conference participants.

The windows being displayed on a display device of a computer system are arranged on the display by the present invention. In one embodiment of the present invention, the arrangement of the different classes of windows can be selected by the individual user of the computer system. A request to arrange the windows on a computer system can be made by a user in any of a wide variety of conventional manners, such as by selection of a menu option or selection of a particular button in a tool bar.

Figure 4A:
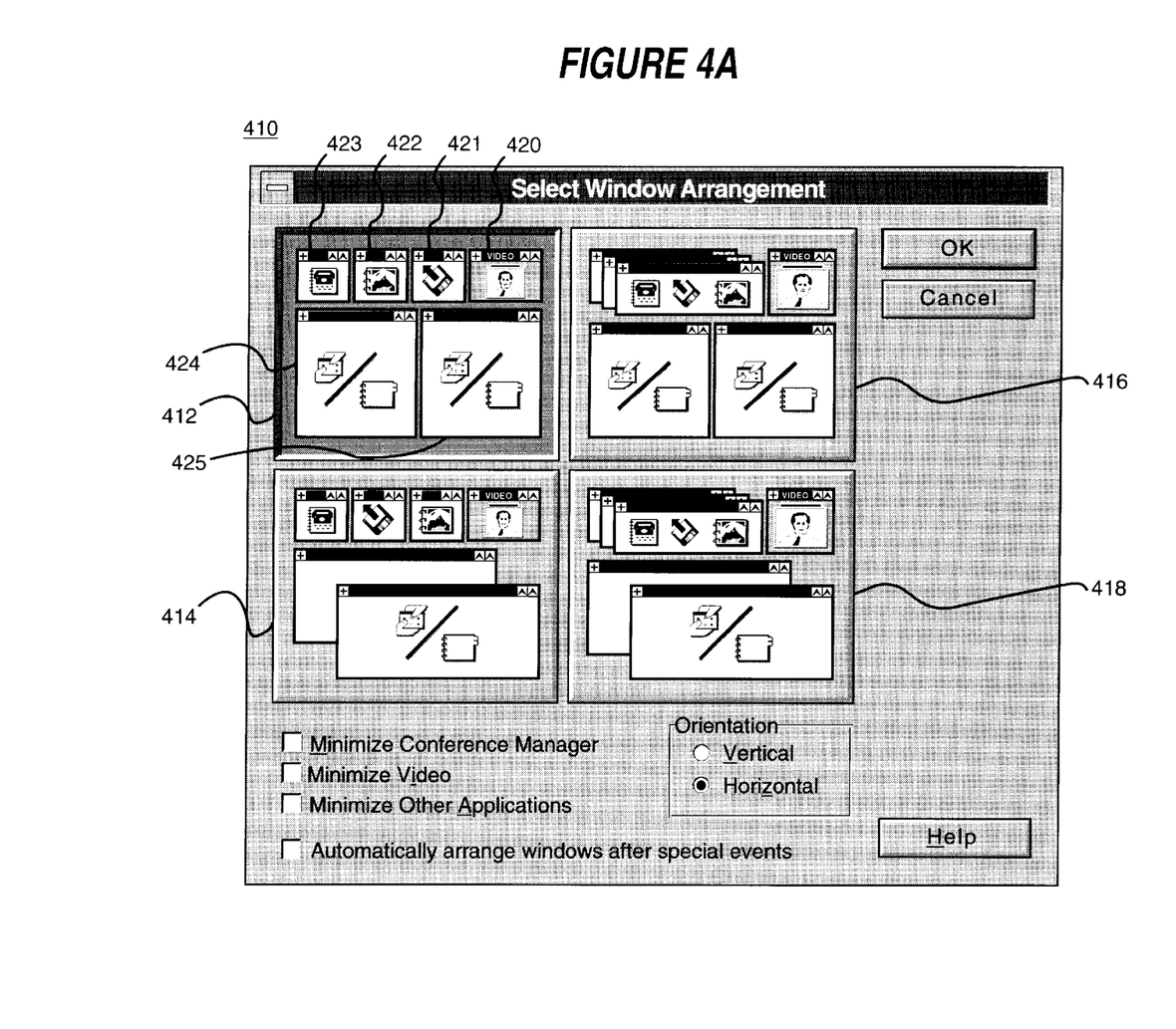
FIGS. 4A and 4B show example window arrangement selections according to one embodiment of the present invention.
Figure 4B:
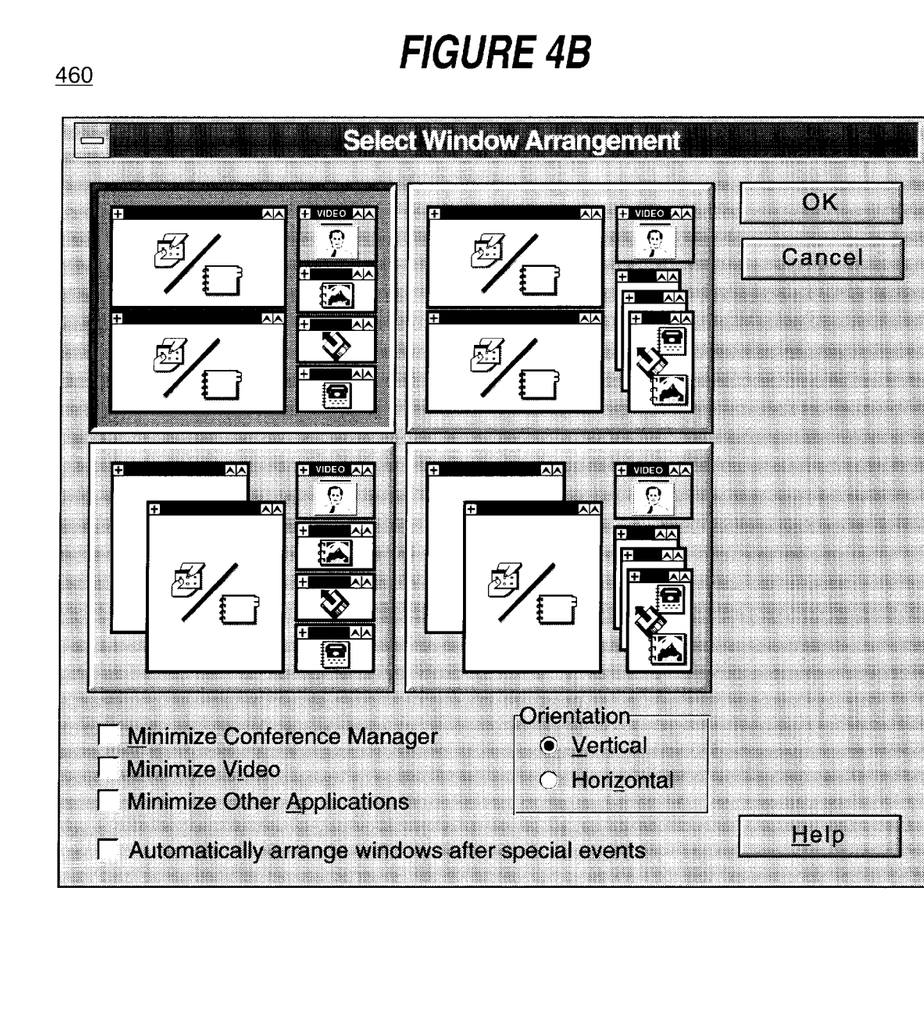

FIGS. 4A and 4B show example window arrangement selections according to one embodiment of the present invention. FIG. 4A shows a window arrangement having a horizontal orientation, whereas FIG. 4B shows a window arrangement having a vertical orientation. FIG. 4A shows an arrangement selection window 410 providing four different arrangement options. Option 412, option 414, option 416 and option 418 are shown. It is to be appreciated that the arrangement selection window 410 is meant as an example only, and that more than or fewer than four arrangement options can be provided.

Looking at option 412 by way of example, a video window placement 420 is shown. In one embodiment of the present invention, the video window is always placed in an area of the display device which is closest to the video camera at a computer system. Placing the video window in this area provides a more personal feel to a conferencing environment because it causes the individual using the end point to look at the video window and thus the camera, thereby causing the individual to "look at" the other conference participant(s). In the examples of FIGS. 4A and 4B, this area is in the top right of the display device.

Three Class 3 windows are also shown in arrangement option 412. The Class 3 windows are windows 421, 422 and 423. By way of example, window 421 could correspond to a file transfer application, window 422 could correspond to a photo exchange application, and window 423 could correspond to a chat application. As shown in FIG. 4A, the three Class 3 windows are displayed in a small area (approximately one-third to one-quarter) of the display device.

Two Class 2 windows are also shown, window 424 and window 425. By way of example, window 424 could be a ProShare™ notebook application being shared between multiple conferencing participants and window 425 could be a spreadsheet program being shared between the conferencing participants.

The Class 2 and Class 3 windows can be tiled or cascaded as shown in FIG. 4A. When tiled, the area of the display device corresponding to that class of window is divided by the number of windows in that class and the windows in that class are reduced in size to correspond to this division. For example, the Class 3 windows are tiled in arrangement options 412 and 414, and the Class 2 windows are tiled in arrangement options 412 and 416. When cascaded, each window in the class is typically a larger size than when tiled, however the windows overlap. For example, the Class 3 windows in arrangement options 416 and 418 are cascaded, and the Class 2 windows in arrangement options 414 and 418 are cascaded.

FIG. 4B shows four additional arrangement options according to one embodiment of the present invention. As shown in FIG. 4B, the arrangement options are similar to those of FIG. 4A, except that the orientation of the windows is vertical rather than horizontal.

It is to be appreciated that the layouts shown in FIGS. 4A and 4B are only examples of possible window arrangements which can be used by the present invention. Any of a wide variety of additional layouts can be provided by the present invention. For example, the tiled arrangements in FIGS. 4A and 4B show a single row of tiles on the display for a particular Class designation. The arrangements could be, however, two rows next to each other for a particular Class designation.

In one embodiment of the present invention, users are able to define their own window arrangements. For example, given the different class designations for a domain, an individual user can decide which locations on the display should be occupied by the different classes of the domain, and how different windows of the same class are to be arranged within the area occupied by that class. Additionally, in one embodiment of the present invention, users are able to define the location of different domains on the display. For example, an individual user can decide which locations on the display should be occupied by different domains.

In one embodiment of the present invention, the arrangement options provided to the user may vary based on the display resolution. For example, a total of sixteen arrangement options may be provided when the display resolution is 1280×1024 pixels, but only four of those sixteen arrangement options may be provided when the display resolution is 640×480 pixels.

Figure 5:
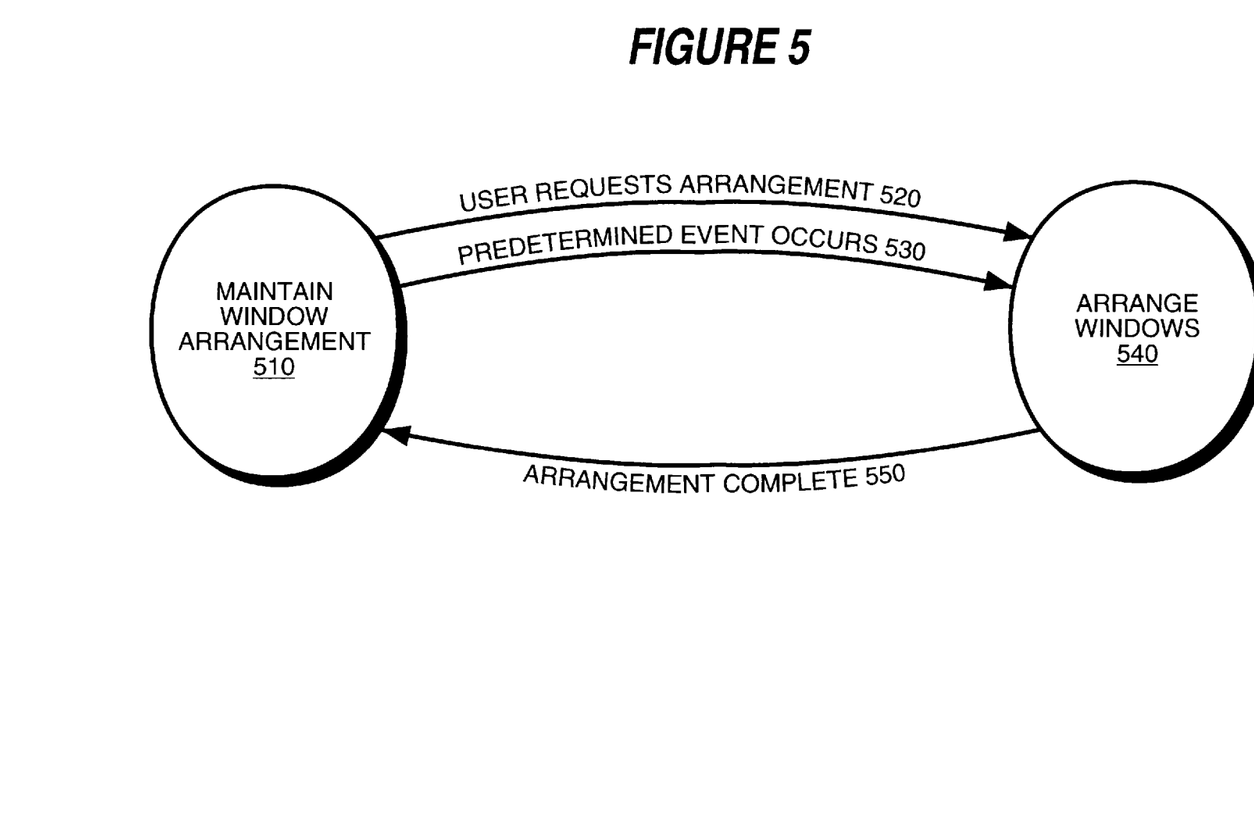
FIG. 5 is a flow diagram showing when the windows on a display are arranged according to one embodiment of the present invention.

FIG. 5 is a flow diagram showing when the windows on a display are arranged according to one embodiment of the present invention. The current window arrangement is initially maintained, stage 510. If a user requests that the windows be arranged, transition 520, then the present invention arranges the windows, stage 540. An arrange request could be received in any of a wide variety of manners, such as selection of a menu option. In addition, the specific arrangement of the windows may be identified, as discussed above with reference to FIGS. 4A and 4B.

Additionally, the windows may also be arranged responsive to a predetermined event. If a predetermined event occurs, transition 530, then the present invention arranges the windows, stage 540. In one embodiment, the present invention maintains an event list (not shown). The occurrence of any of the events in the event list causes the windows to be arranged. In one embodiment of the present invention, the event list includes the following events: opening a new window, removing an old window, minimizing a window to an icon, restoring a window from an icon, starting a conferencing connection, ending a conferencing connection, changing an application within the domain from being shared to not being shared (or from unshared to shared), and switching tasks (e.g., changing the active window).

The present invention can identify when one of the events in the event list occurs in any of a wide variety of manners. In one embodiment, a connection manager sends a message to the present invention when certain events occur (e.g., a conferencing connection is made). Additionally, the present invention can monitor window events and check whether an event which occurs matches an event on the event list. Monitoring window events is well-known to those skilled in the art and thus will not be discussed further.

Once the windows have been arranged, the present invention returns to maintain the window arrangement, transition 550. It should be noted that the window arrangement maintained is now the new arrangement rather than the previously maintained arrangement. In one embodiment of the present invention maintaining the window arrangement in stage 510 does not prevent an individual user from manually re-arranging the windows in a conventional manner (e.g., dragging or re-sizing a window).

Figure 6:
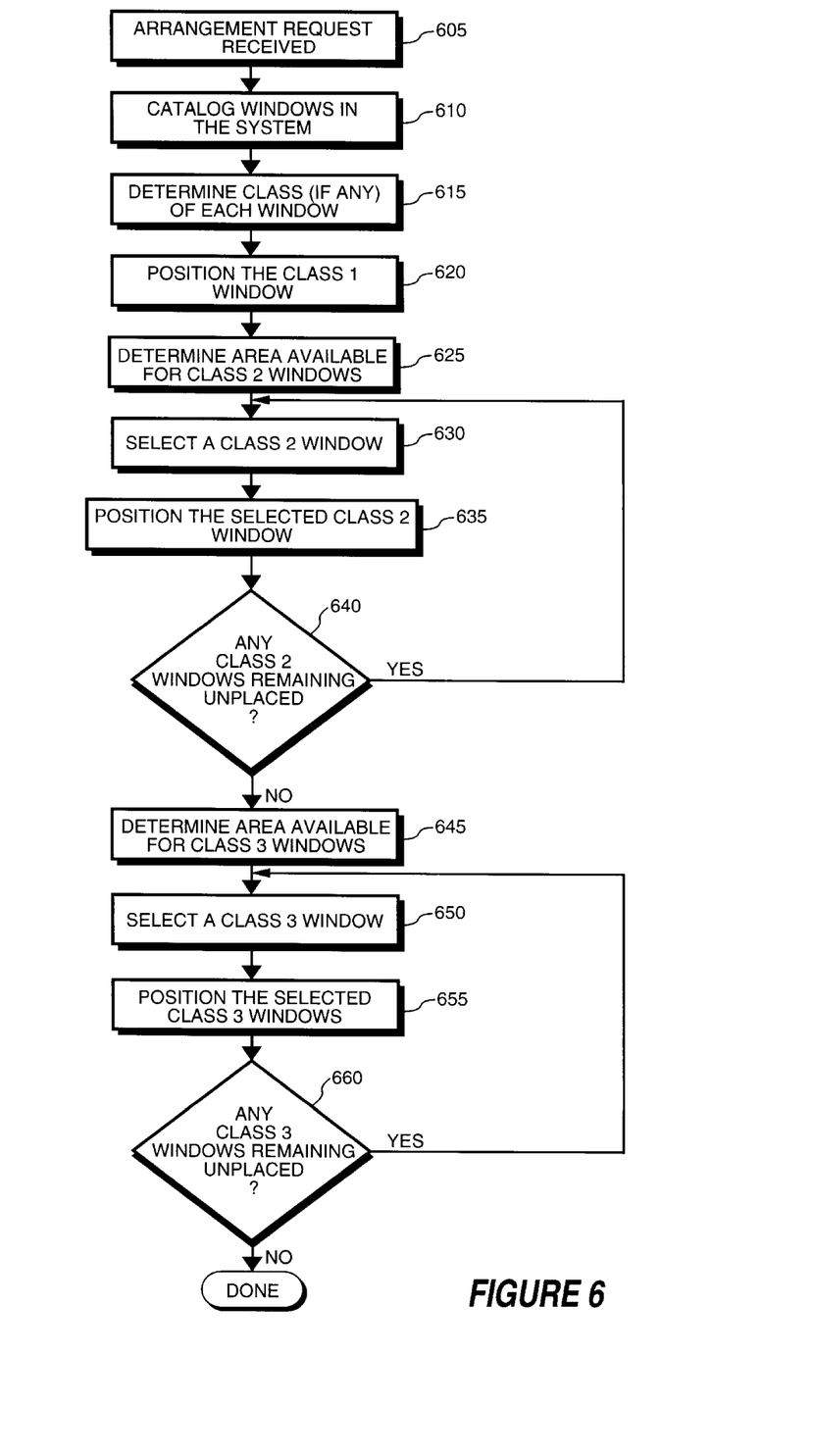
FIG. 6 is a flowchart showing the steps followed in arranging windows within a domain according to one embodiment of the present invention.

FIG. 6 is a flowchart showing the steps followed in arranging windows within a domain according to one embodiment of the present invention. In one embodiment, the steps of FIG. 6 are repeated for each window domain being displayed. As shown in the steps described below, the arrangement of windows is based on the classes of the windows, thereby providing a degree of intelligence to the arranging performed by the present invention.

A window arrangement request is first received, step 605. This request can be received, for example, as a request by a user or as a result of a predetermined event occurring, as discussed above. It should be noted that the request can be received for a particular window domain or for all domains.

Once the request is received, the present invention catalogs the windows of the computer system, step 610. In one embodiment, this includes both display windows and windows which have been minimized to icons. In one embodiment, this cataloging is done in a conventional manner using conventional Microsoft Windows™ commands, such as the "EnumWindows" command.

The present invention then determines the class (if any) of each window cataloged in step 610, step 615. In one embodiment, the class of an application is determined by sending a message conforming to a conventional Windows™ messaging protocol. The present invention sends a message to each of the windows which were cataloged in step 610. The message requests the receiving window to indicate its class.

In one embodiment of the present invention, each application corresponding to a conferencing window is preprogrammed with its class. For example, the object code of a word processing application could include an identifier indicating Class 2. Thus, when a window of the application receives a request to identify its class, then the window returns the indication of Class 2.

It is possible that certain windows may not be aware of their classes. In one embodiment of the present invention, this situation is resolved by those windows which are unaware of their class ignoring the request. Alternatively, those windows which are unaware of their class could return a message indicating an error. Thus, the present invention knows that any window which does not return a class identifier is unaware of its class. In one embodiment, the present invention assumes that any window which does not return a class corresponds to a non-conferencing window.

In one embodiment of the present invention, individual users are able to assign particular classes to windows which are not aware of their own class. The present invention could, for example, maintain a record of these assigned classes for the windows. Then, when the windows are being arranged, the present invention can, based on this record, include the windows in the arrangement for the domain even though the windows did not respond to the message in step 615.

In one embodiment, the present invention generates a list (not shown) after steps 610 and 615 of all the windows of the computer system as well as a list of all the windows within the domain(s) and their classes. Thus, the present invention can readily determine, for each window at the end point, what class that window is.

Once all of the classes are determined in step 615, the present invention positions the Class 1 window(s), step 620. In one embodiment of the present invention, there is only a single Class 1 window. Additionally, in one embodiment the present invention automatically places the Class 1 window in the top right corner of the display device. In one embodiment of the present invention, windows are positioned using conventional Microsoft Windows™ commands, such as the "SetWindowPos" command.

Figure 7:
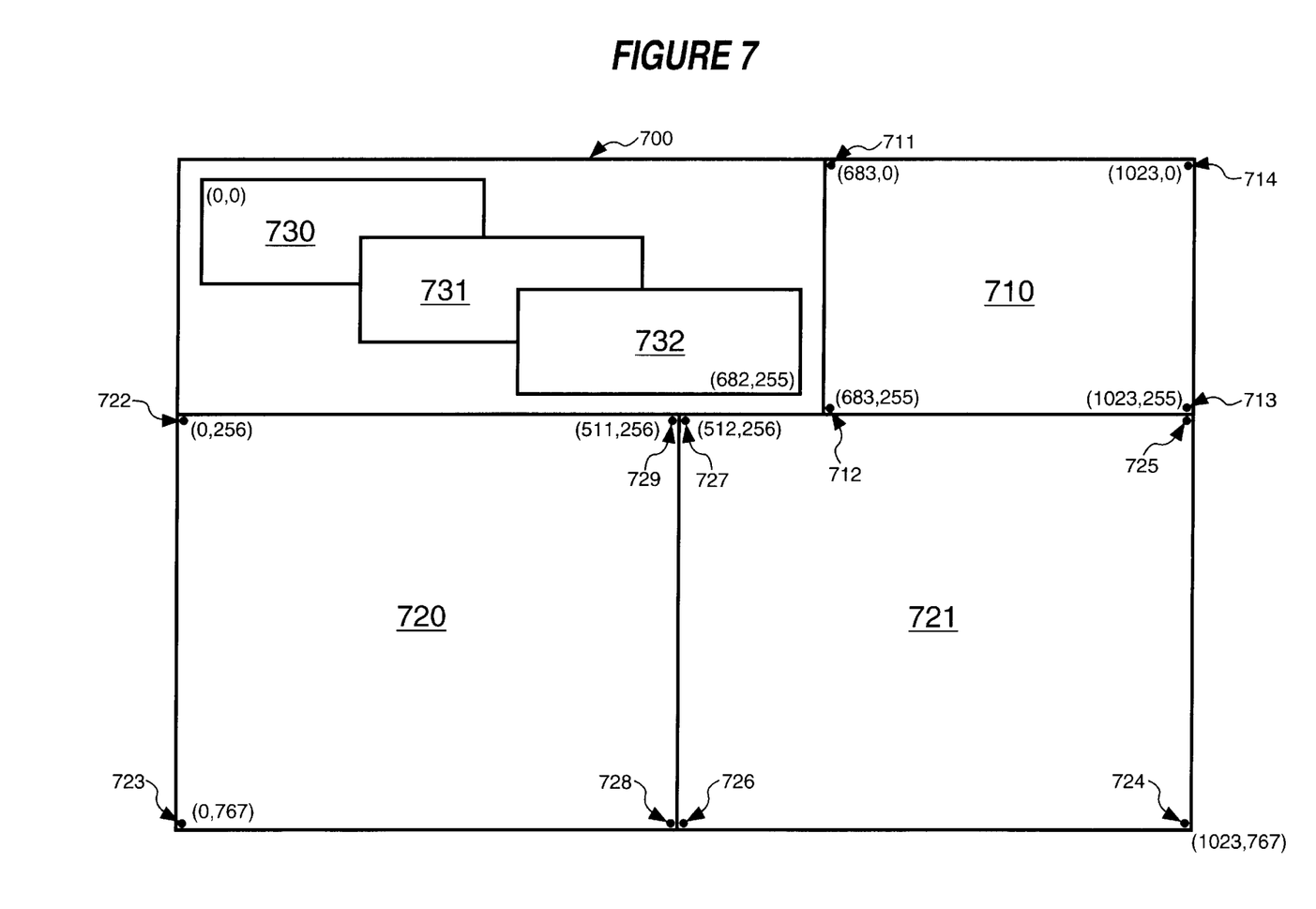
FIG. 7 shows an example arrangement of windows within a domain on a display such as may be produced by the present invention.

FIG. 7 shows an example arrangement of windows within a domain on a display device such as may be produced by the present invention. In the example of FIG. 7, there is a single window domain (corresponding to, for example, conferencing windows). Any windows which are not part of the domain (including any minimized windows) are overlaid by the domain windows.

A display 700 having a resolution of 1024×768 pixels is shown having a video window 710 (a Class 1 window), two Class 2 windows 720 and 721, and three Class 3 windows 730, 731, and 732. Video window 710 is positioned first. In the embodiment shown, video window 710 occupies the area which is the top right one-third of display 700. Thus, as shown, the area of the Class 1 window is the rectangle defined by display location 711, display location 712, display location 713 and display location 714. In one embodiment, the display locations 711, 712, 713 and 714 are the pixels (683,0), (683,255), (1023,255), and (1023,0), respectively.

It is to be appreciated that slightly different display locations may result from different embodiments due to rounding differences. For example, display 700 has a width of 1024 pixels. However, 1024÷3=341.33. Thus, the actual width of video window 710 could be rounded to, for example, 341 pixels (as shown) or 342 pixels.

The positioning of the Class 1 window provides a location 712 from which the remaining window classes can be referenced. For example, in the horizontal orientation shown in FIG. 7, the area of the display 700 which is above and to the left of location 712 is used for the Class 3 windows, and the area of the display 700 which is below location 712 is used for the Class 2 windows, as discussed in more detail below.

Returning to FIG. 6, the present invention then determines the area of the display device which is available for Class 2 windows, step 625. In one embodiment, this is a rectangular area to the left of or below the video window. In one embodiment, the present invention also determines a location of reference points, such as the four corners of a rectangle window, of each area subsequently to be filled with a Class 2 window. This determination can be made in a conventional manner based on the number of Class 2 windows which will be placed and the placement style chosen (for example, tiled or cascaded).

The present invention then selects a Class 2 window, step 630, and positions the selected Class 2 window on the display device, step 635. The exact positioning of the selected Class 2 window is dependent on the arrangement option selected (for example, horizontal or vertical orientation) and how many other Class 2 windows have been placed and how many remain to be placed.

The present invention then checks whether any Class 2 windows remain which have not yet been placed, step 640. If any unplaced Class 2 windows remain, then the present invention selects and places another Class 2 window in steps 630–635. Steps 630–640 are repeated until all Class 2 windows have been placed.

The display 700 of FIG. 7 shows two Class 2 windows, window 720 and window 721. The area of display 700 to be used for the Class 2 windows is determined based on the location 712 of the Class 1 window 710. In the example shown in FIG. 7, the area below location 712 (for example, all display locations with a y-coordinate value greater than the y-coordinate value of location 712) is the area used by the present invention for the Class 2 windows. This area is the rectangle defined by display location 722, display location 723, display location 724 and display location 725.

For a tiled arrangement as shown in FIG. 7, the area for the Class 2 windows is divided by the total number of Class 2 windows. In the example shown, there are two Class 2 windows 720 and 721. Thus, the area is divided in half, with window 720 being the rectangle defined by display location 722, display location 723, display location 728, and display location 729, and window 720 being the rectangle defined by display location 727, display location 726, display location 724, and display location 725. It is to be appreciated that slight variances could exist due to rounding differences, as discussed above.

In an alternate embodiment, the windows 720 and 721 may be cascaded (not shown). In this alternate embodiment, the location of each of the Class 2 windows is, for example, below and to the right of the previous window by a predetermined offset. In one implementation, this offset is a number of pixels equal to the height of the caption bar plus the height of the frame.

Returning to FIG. 6, once all of the Class 2 windows have been placed, the present invention determines the area on the display device available for Class 3 windows, step 645. The present invention then proceeds to select a Class 3 window, step 650, and position the selected Class 3 window, step 655. Steps 650–660 are repeated until all of the Class 3 windows have been placed. The placement of the Class 3 windows is done in the same manner as the placement of the Class 2 windows discussed above in steps 625–640, except that the location on the display device for the windows is different.

The display 700 of FIG. 7 shows three Class 3 windows: window 730, window 731, and window 732. The area used for the Class 3 windows in the example of FIG. 7 is the area defined by display locations having an x-coordinate which is less than the x-coordinate of location 712 and a y-coordinate which is less than or equal to the y-coordinate of location 712. The Class 3 windows are shown on display 700 as being cascaded, however it is to be appreciated that they may also be tiled.

Returning to FIG. 6, the flowchart of FIG. 6 shows the automatic arrangement of windows according to one embodiment of the present invention. In alternate embodiments of the present invention, the windows are arranged in different orders. For example, the Class 1 window may be positioned, followed by the Class 3 windows being positioned, then the Class 2 windows being positioned. Alternatively, the present invention may alternately position Class 2 and Class 3 windows.

In one embodiment, the present invention also obtains a domain identifier for each window prior to arranging the windows. This can be done along with the messages requesting the classes in step 615 of FIG. 6, or alternatively can be done prior to the steps shown in FIG. 6. In one embodiment, the present invention maintains a list of the domain identifiers of each application executing on the computer system. This list could be created, for example, by the user of the computer system identifying the different domains he or she is using and which applications are within which domains. Alternatively, each application may be preprogrammed with its domain identifier, along with its class identifier as discussed above.

Figure 8:
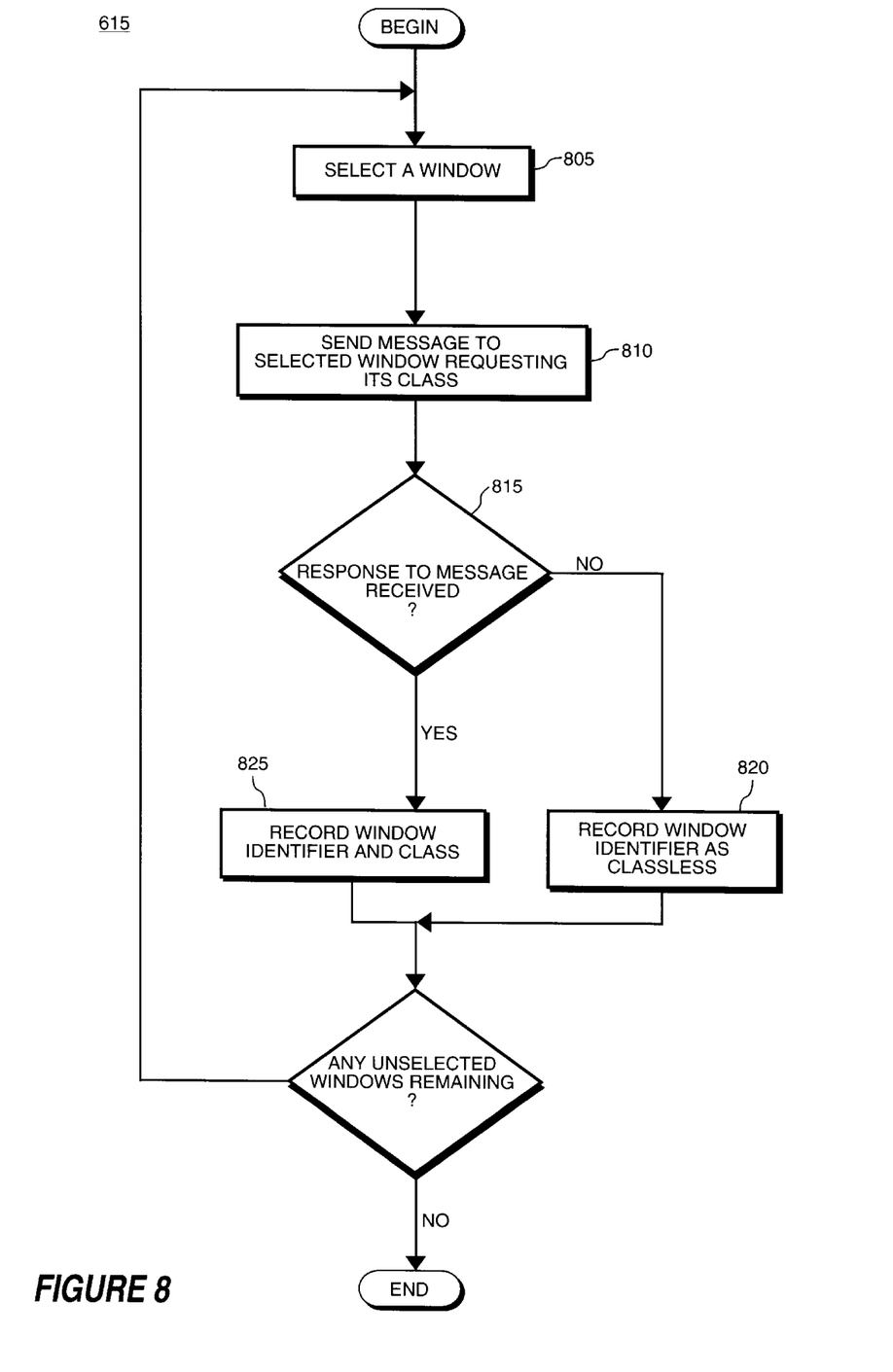
FIG. 8 is a flowchart showing the steps followed in determining the classes of each window according to one embodiment of the present invention.

FIG. 8 is a flowchart showing the steps followed in determining the classes of each window according to one embodiment of the present invention. In one embodiment, the method of FIG. 8 shows step 615 of FIG. 6 in more detail.

The present invention first selects a window being displayed by the computer system, step 805. In one embodiment, the selected window can be a minimized windows. A minimized window refers to an icon displayed on the display device, typically displayed at the bottom of the display, rather than a full window showing data.

The present invention then sends a message to the selected window requesting its class, step 810, and checks whether the targeted window responded to the message, step 815. In one embodiment, a window which is unaware of its class does not respond to the class request message sent in step 810. In an alternate embodiment, a window which is unaware of its class responds with an error, "don't know" or similar message. In this alternate embodiment, the present invention treats such a response as the equivalent of no response in step 815.

In one embodiment of the present invention, only the display windows which are to be arranged know their class. Thus, for example, in a conferencing environment only the conferencing windows know their class and respond to the message from step 810.

If the targeted window does not respond, then the present invention records the window identifier as classless, step 820. In one embodiment, the present invention maintains a list of the Class 1 windows, the Class 2 windows, the Class 3 windows, and the classless windows. In this embodiment, the present invention adds the window identifier of the targeted window to the classless list in step 820. The present invention then proceeds to step 830, discussed below.

Returning to step 815, if the targeted window does respond, then the response includes the class of the targeted window. The present invention then records the window identifier as having the indicated class, step 825. In one embodiment, this recordation is done by adding the window identifier to the appropriate class window list maintained by the present invention.

The targeted window identifier is placed in one of the lists by the present invention in steps 820 and 825. The present invention then checks whether there are any unselected windows remaining, step 830. If no unselected windows remain, that is, no windows remain which have not already had their class (or lack of class) identified, then the process is complete. However, if any unselected windows remain, then the present invention repeats steps 805–830 until all of the windows have been selected and their classes identified.

Figure 9:
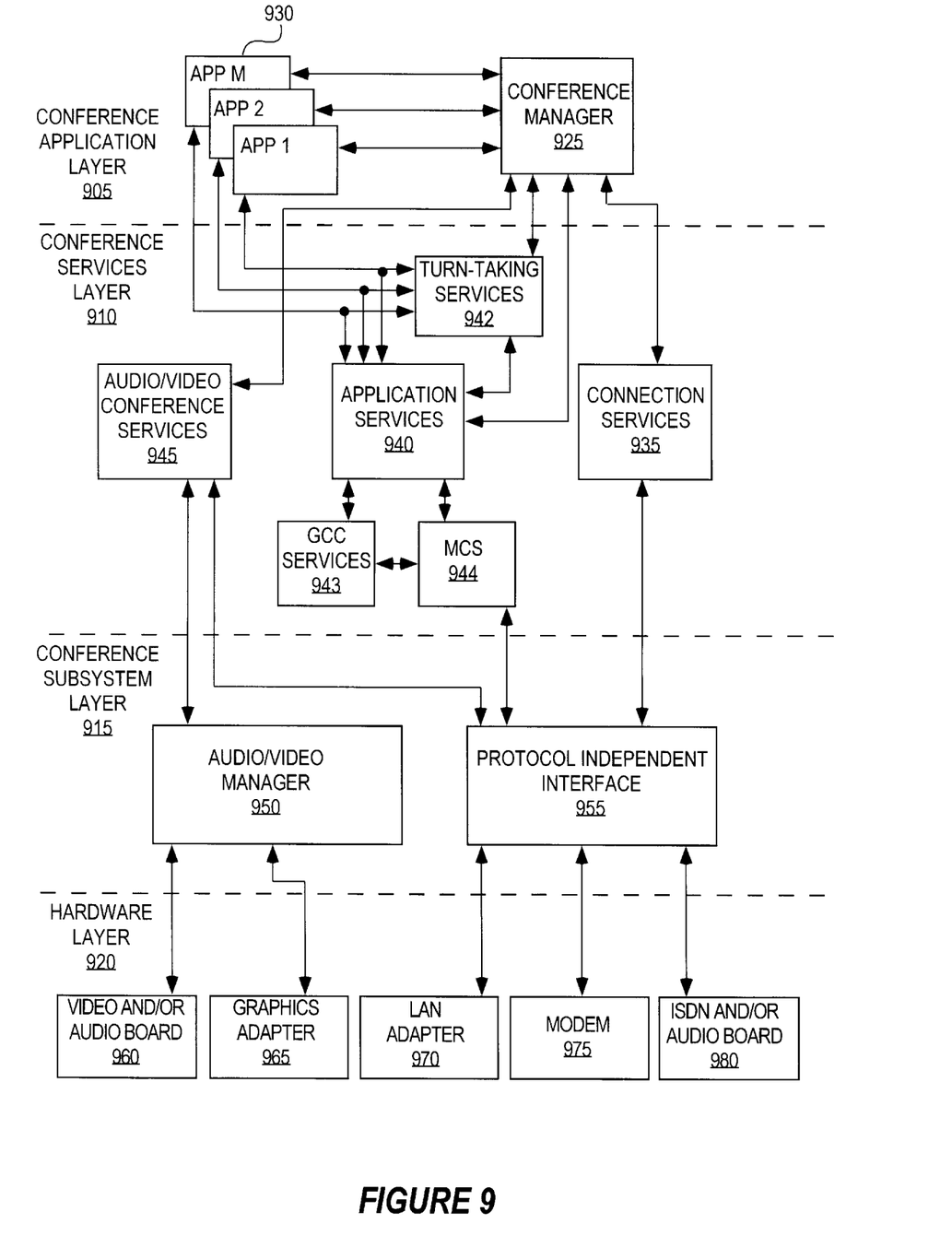
FIG. 9 is a block diagram showing an architectural overview of conferencing on an end point such as may be used with one embodiment of the present invention.

FIG. 9 is a block diagram showing an architectural overview of conferencing on an end point such as may be used with one embodiment of the present invention. As shown in FIG. 9, the conferencing architecture is separated into multiple layers. These layers are conference application layer 905, conference service layer 910, conference subsystem layer 915, and hardware layer 920.

Conference application layer 905 includes conference manager 925 and multiple applications 930. Conference manager 925 provides a conferencing interface to the user of the end point. In one embodiment, the conferencing interface is a graphical user interface (GUI). In one implementation, conference manager 925 includes options, such as through a menu, which allows the end point user to add or delete applications to the conference.

Applications 930 are M applications which represent any of a wide variety of conventional software applications. In one embodiment of the present invention, one of the applications 930 is a notebook application which is provided by the ProShare™ conferencing system. The notebook application allows the end point users to input text and/or drawings for the conference. In one implementation, additional applications are, for example, application sharing software, a high-quality image sharing application(s), or a file transfer application(s).

Conference application layer 905 is coupled to conference service layer 910. Conference service layer 910 includes connection services 935, application services 940, turn-taking services 942, generic conference control (GCC) services 943, multipoint communication services (MCS) 944, and audio/video conference services 945. Connection services 935 establishes and maintains connections with the other end point(s), via the MCU if necessary. Connection services 935 interfaces between the conference subsystem layer 915 and conference manager 925 when establishing connections which are initiated by either this end point or another end point. In one embodiment, connection services 935 also includes address book services which provide services related to managing connection addresses for conference participants.

Application services 940 provides an interface between applications 930 and conference manager 925, and conference subsystem layer 915. Application services 940 also provides an interface between applications 930 and conference manager 925, and GCC services 943 and MCS 944. In one implementation, application services 940 also prevents one application from unfairly dominating the communication services of lower layers.

Turn-taking services 942 provides an interface between applications 930 and conference manager 925, and application services 940. Turn-taking services 942 provides a library of procedure calls to support turn-taking control. Turn-taking control is a protocol which identifies when and under what circumstances a particular individual is able to input conference data to the conference.

GCC services 943 maintains a record of the applications 930 which are executing on the end point and provides registry services to allow applications 930 to register with GCC services 943.

MCS 944 provides support for full-duplex multipoint communication among an arbitrary number of connected application entities over a variety of conventional networks. In one implementation, MCS 944 provides multipoint message routing and message broadcasting. The multipoint message routing ensures that the other end points all receive messages from this system in the same order, and identifies the shortest path to each of the other end points. Message broadcasting allows connection information to be broadcast to all end points in the conference.

Audio/Video conferencing services 945 provides an interface between conference subsystem layer 915 and conference manager 925. Audio/Video services 945 provide audio and video services to conference application layer 905, such as capture and playback services for video streams.

Conference subsystem layer 915 operates in a conventional manner to provide an interface between the protocol-independent conference service layer 910 and the specific protocols of the devices in hardware layer 920. Audio/video manager 950 provides an interface which receives audio and video data from audio/video conference services 945 and outputs it to the hardware layer 920 for display or audio play.

Protocol independent interface 955 provides an interface between the components of conference service layer 910 and hardware layer 920. Interface 955 receives data and messages from the components of conference service layer 910 and converts the information received to the proper format based on the hardware connected to the system.

Hardware layer 920 includes video and/or audio board 960 and graphics adapter 965. The board 960 and adapter 965 are conventional computer system boards for realizing video and/or audio outputs. For example, the video outputs may be realized on a display device and the audio outputs may be realized via a computer system speaker. The board 960 and adapter 965 also provide sampling digitization, compression/decompression of audio signals exchanged between two end points over a full-duplex audio connection, as well as interfacing with the proper CODEC to compress and decompress the video signals.

Hardware layer 920 also includes a LAN adapter 970, modem 975, and ISDN and/or audio board 980. LAN adapter 970 is a conventional LAN adapter, such as an Ethernet adapter. Modem 975 is a conventional line for coupling the end point to a POTS line. ISDN and/or audio board 980 is a conventional ISDN line which can also include audio support.

It is to be appreciated that, depending on the conferencing environment, all of the components of hardware layer 920 may not be included. For example, LAN adapter 970 may not be included in one of the end points.

In one embodiment of the present invention the window arrangement mechanism of the present invention is provided to the endpoints by application services 940. Conference manager 925 provides an interface which allows the user to select the window arrangement option via a menu option, toolbar button, or similar means.

In one embodiment of the present invention, windows are re-arranged on the display device as the new locations are identified in FIG. 6. In an alternate embodiment, arrangement does not take place until after the locations for all display windows have been determined.

It should be noted that, under certain circumstances, the size of the window as identified by the present invention may be smaller than the minimum size allowed by the operating system. In one embodiment, the present invention resolves this situation by placing the window at the location identified by the present invention, but using the minimum window size (according to the operating system) rather than the window size identified by the present invention.

In one embodiment, the present invention is implemented as a series of software routines executed on one or more processors of a computer system (such as processors 102–103 of FIG. 1). Initially, these software routines may be stored in a storage device (such as mass storage device 125 of FIG. 1). When the arrangement function is invoked, the instructions are copied from the storage device into memory (such as RAM 121) and then accessed and executed by processor 102 and/or processor 103. In one implementation these software routines are written in the C++ programming language. However, it is to be appreciated that these routines may be implemented in any of a wide variety of programming languages. Alternatively, the present invention can be implemented in discrete hardware or firmware.

In one embodiment of the present invention, display windows can change their Classes. For example, it may be desirable to have a chat application with a window that could be a Class 2 or a Class 3 window, or even a classless window. The application could automatically set its class, or a user could identify which class it wants the application to be.

In one embodiment, the present invention uses the entire display for the conferencing windows and minimizes any non-conferencing windows to icons. In one implementation, the present invention maintains an area of the display (for example, a rectangular area at the bottom of the display) for these minimized windows. It is to be appreciated that in this implementation, the present invention operates as described above, except that the display size available for the display windows being arranged is changed. For example, if the display resolution is 1280×1024 pixels, then the area available for the display windows being arranged may be for example, only 1280×952 pixels (leaving a 1280×72 pixel strip for icons).

In one embodiment, the present invention supports different communications for different classes of windows. In this embodiment, specific windows within a class of a domain may recognize certain messages which are not recognized by windows of other classes. For example, a conferencing manager window may be the only class 1 window of a domain, and the conferencing manager window may recognize a message to split the video portion of the conference manager window from the remainder of the conference manager window. In this embodiment, only that class 1 window recognizes such a message.

In some of the descriptions above, the present invention is described as arranging windows on an end point in a conferencing environment. It is to be appreciated that the use of the present invention in a conferencing environment is only one example of the use of the present invention. It is to be appreciated that the present invention can be used to arrange windows within domains on a display in any of a wide variety of environments, including non-conferencing environments. In these alternate embodiments, the present invention need not distinguish between conferencing and non-conferencing windows.

The descriptions above include many references to specific locations on a display device for placement of particular windows. It is to be appreciated that these locations are only examples. It is to be appreciated that a wide variety of window locations could be used within the spirit and scope of the present invention.

The descriptions above also describe three different Class designations. It is to be appreciated, however, that alternate embodiments of the present invention could include any number of Class designations. In these alternate embodiments, the display is separated into a number of different areas which equals the number of possible Class designations (or possibly only Class designations for windows currently being displayed). It is also to be appreciated that different domains can include different class designations.

Whereas many alterations and modifications of the present invention will be comprehended by a person skilled in the art after having read the foregoing description, it is to be understood that the particular embodiments shown and described by way of illustration are in no way intended to be considered limiting. References to details of particular embodiments are not intended to limit the scope of the claims.

Thus, a method and apparatus for automatically and intelligently arranging windows on a display device has been described.

What is claimed is:

1. A method comprising:
   recognizing a domain of one or more windows among a plurality of windows on a display;
   identifying a class designation for each window of the domain of windows, wherein one or more windows of the domain of windows have a same class designation; and
   re-arranging automatically the plurality of windows on the display according to the domain and the class designation, wherein windows of the domain having the same class designation are treated equally in the re-arranging.

2. The method of claim 1, wherein the identifying comprises:
   requesting the class designation from each of the domain of windows; and
   recording the class designation identified by each of the domain of windows.

3. The method of claim 1, wherein the re-arranging comprises:
   dividing the display into a plurality of display areas;
   allocating a first number of display areas of the plurality of display areas to the domain of windows, wherein the first number of display areas corresponds to a second number of different class designations in the domain of windows; and
   positioning each window of the domain of windows having the same class designation in one of the first number of display areas.

4. The method of claim 3, wherein the re-arranging further comprises:
   positioning each window of the domain of windows having the same class designation in one of the first number of display areas in a tiled manner.

5. The method of claim 3, wherein the re-arranging further comprises:
   positioning each window of the domain of windows having the same class designation in one of the first number of display areas in a cascaded manner.

6. A method comprising:
   recognizing a domain of one or more windows among a plurality of windows on a display;
   determining a class designation for each window of the domain of windows wherein one or more windows of the domain of windows have a same class designation;
   dividing the display into a plurality of areas; and
   positioning automatically each window of the domain of windows corresponding to a particular class designation equally in a same one of the plurality of areas.

7. The method of claim 6, wherein each of a plurality of domains of the plurality of windows on the display corresponds to a different one of a plurality of applications which are being executed in a conferencing environment, wherein a domain can be one window.

8. The method of claim 6, wherein the dividing comprises separating a portion of the display into the plurality of areas, wherein the portion of the display is less than the entire display.

9. The method of claim 6, wherein the determining further comprises:
   sending a message to a first window of the plurality of windows requesting a first class designation identifier which corresponds to the first window; and
   recording the first class designation identifier and a window identifier, wherein the window identifier corresponds to the first window.

10. The method of claim 6, wherein the method is responsive to an occurrence of a predetermined event.

11. The method of claim 10, wherein the predetermined event comprises opening a new window of the plurality of windows.

12. The method of claim 10, wherein the predetermined event comprises closing a first window of the plurality of windows.

13. An apparatus comprises:
   a bus;
   a storage device, coupled to the bus; and
   a processor, coupled to the bus, the processor to recognize a domain of one or more windows among a plurality of windows on a display, to identify a class designation for each window of the domain of windows, wherein one or more windows of the domain of windows have a same class designation, and to automatically re-arrange the plurality of windows on the display according to the domain and the class designation, wherein windows of the domain of windows having the same class designation are treated equally in the re-arranging.

14. The apparatus of claim 13, wherein the processor is also to divide the display into a plurality of display areas, allocate a first number of display areas of the plurality of display areas to domain of windows, wherein the first number of display areas corresponds to a second number of different class designation in the domain of windows, and position each window of the domain of windows having the same class designation in one of the first number of display areas.

15. An apparatus comprises:
   means for recognizing a domain of one or more windows among a plurality of windows on a display;
   means for determining a class designation for each window of the domain of windows, wherein one or more windows of the domain of windows have a same class designation;
   means for dividing the display into a plurality of areas; and
   means for positioning automatically each window of the domain of windows corresponding to a particular class designation equally in a same one of the plurality of areas.

16. The apparatus of claim 15, wherein the means for dividing comprises means for separating a portion of the display into the plurality of areas, wherein the portion of the display is less than the entire display.

17. The apparatus of claim 15, wherein the means for determining further comprises:
   means for sending a message to a first window of the domain of windows requesting a first class designation identifier which corresponds to the first window; and
   means for recording the first class designation identifier and a window identifier, wherein the window identifier corresponds to the first window.

18. The apparatus of claim 15, wherein the means for recognizing, means for determining, means for dividing, and means for positioning are each responsive to an occurrence of a predetermined event.

19. The apparatus of claim 18, wherein the predetermined event comprises opening a new window of the plurality of windows.

20. A machine-readable storage medium having stored therein a plurality of programming instructions for use by a processor, wherein the plurality of programming instructions implements the method of:
   recognizing a domain of one or more windows among a plurality of windows on a display;
   identifying a class designation for each window of the domain of windows, wherein one or more windows of the domain of windows have a same class designation; and
   re-arranging automatically the domain of windows on the display according to the domain and the class designation, wherein windows of the domain of windows having the same class designation are treated equally in the re-arranging.

21. The machine-readable storage medium of claim 20, wherein the identifying comprises:
   requesting the class designation from each of the domain of windows; and
   recording the class designation identified by each of the domain of windows.

22. The machine-readable storage medium of claim 20, wherein the re-arranging comprises:
   dividing the display into a plurality of display areas;
   allocating a first number of display areas of the plurality of display areas to the domain of windows, wherein the first number of display areas corresponds to a second number of different class designations in the domain of windows; and
   positioning each window of the domain of windows having the same class designation in one of the first number of display areas.

23. The machine-readable storage medium of claim 22, wherein the re-arranging further comprises:
   positioning each window of the domain of windows having the same class designation in one of the first number of display areas in a tiled manner.

24. The machine-readable storage medium of claim 22, wherein the re-arranging further comprises:
   positioning each window of the domain of windows having the same class designation in one of the first number of display areas in a cascaded manner.

* * * * *